United States Patent [19]
Plas et al.

[11] Patent Number: 6,116,646
[45] Date of Patent: Sep. 12, 2000

[54] TILT STEERING MECHANISM AND METHOD

[75] Inventors: Matthew John Plas, Elyria; Robert W. Rush, Amherst, both of Ohio

[73] Assignee: MTD Products Inc., Cleveland, Ohio

[21] Appl. No.: 09/010,602

[22] Filed: Jan. 22, 1998

[51] Int. Cl.[7] .................................................. B62D 1/187
[52] U.S. Cl. ........................... 280/775; 74/493; 464/112; 403/131; 403/141
[58] Field of Search .............................. 280/775; 74/493; 464/112; 403/131, 141

[56] References Cited

U.S. PATENT DOCUMENTS

| | | | |
|---|---|---|---|
| 771,457 | 10/1904 | Bullard | 403/131 |
| 791,275 | 5/1905 | Lofton | 74/493 |
| 3,167,971 | 2/1965 | Zeigler et al. | 74/493 |
| 3,199,625 | 8/1965 | Liebreich | 74/493 |
| 3,487,712 | 1/1970 | Steiner | 74/493 |
| 3,718,053 | 2/1973 | Cinadr | 280/775 |
| 4,279,176 | 7/1981 | Minamitani | 74/493 |
| 4,941,766 | 7/1990 | Carlson | 74/493 |
| 4,993,279 | 2/1991 | Doescher et al. | 74/493 |
| 5,282,394 | 2/1994 | Dominique et al. | 74/493 |
| 5,452,624 | 9/1995 | Thomas et al. | 74/493 |
| 5,613,404 | 3/1997 | Lykken et al. | 74/493 |

*Primary Examiner*—Peter C. English
*Attorney, Agent, or Firm*—Emerson & Associates; Roger D. Emerson; Timothy D. Bennett

[57] ABSTRACT

A lawn tractor has a pivoting shaft mechanism and a tilt steering mechanism. The lawn tractor includes a frame, a first wheel, a steering implement for steering the wheel, and a power steering pump for use in providing power for the steering of the first wheel. The pivoting shaft mechanism includes a steering shaft having a first end that is connected to the steering implement and that is pivotable about its second end. The pivoting shaft mechanism also includes a pin operatively connected to the second end of the steering shaft, a connecting shaft having a first end operatively connected to the second end of the steering shaft and a second end operatively connected to the power steering pump, and a pivot coupling for translating rotational motion from the pin to the first end of the connecting shaft. The tilt steering mechanism includes an index member for indexing the steering shaft in any one of a plurality of tilt positions, a tilt lever for use in adjusting the steering shaft into any one of the plurality of tilt positions, and a carrier for use in pivoting the tilt lever. The index member moves with the steering shaft as the steering shaft is tilt adjusted.

19 Claims, 6 Drawing Sheets

TILT STEERING MECHANISM AND METHOD

BACKGROUND OF THE INVENTION

1. Field of Invention

This invention pertains to the art of methods and apparatuses for tilt steering mechanisms, and more specifically to methods and apparatuses for a tilt steering mechanism for a lawn tractor that does not use a universal joint.

2. Description of the Related Art

It is known in the art to provide lawn tractors with tilt steering mechanisms thereby enabling the operator to tilt the steering shaft into any one of a number of positions. This is typically done to increase the comfort of the operator. Such tilt steering mechanisms have proven to be adequate for their intended purpose. Known tilt steering mechanisms, however, do have certain problems and shortcomings.

One problem occurs when a large force is applied to the steering wheel such as when the operator supports his weight when getting on or off the lawn tractor. The problem is that such a large force can cause the steering shaft to move out of its desired tilt position. The operator is then required to re-adjust the tilt steering mechanism.

Another problem is that the generous tolerances typically required between the moving parts of known tilt mechanisms can eventually produce a "loose feeling" at the steering wheel for the operator. By loose feeling it is meant that excessive play is felt in the steering system. Such loose feelings are therefore undesirable.

Typically tilt steering mechanisms include a lever that pivots about a pivot pin. What is needed is a tilt steering mechanism that eliminates the need for such a pivot pin.

It is also common in the art for tiltable steering shafts to use a universal joint. Such universal joints are heavy and therefore undesirable. What is needed is a pivotable steering shaft that eliminates the need for a universal joint.

The present invention provides methods and apparatus for reducing these problems and shortcomings. The difficulties inherent in the art are therefore overcome in a way that is simple and efficient while providing better and more advantageous overall results.

SUMMARY OF THE INVENTION

According to one aspect of the invention, a lawn tractor is equipped with a pivoting shaft mechanism and a tilt steering mechanism. The lawn tractor has a frame, a first wheel operatively connected to the frame, a steering implement for use in steering the first wheel, and a power steering pump for use in providing power for the steering of the first wheel. The pivoting shaft mechanism includes a steering shaft having first and second ends for use in turning the first wheel. The first end of the steering shaft is operatively connected to the steering implement and the steering shaft is pivotable about its second end. The pivoting shaft mechanism also includes a pin operatively connected to the second end of the steering shaft, a connecting shaft having a first end operatively connected to the second end of the steering shaft and a second end operatively connected to the power steering pump, and a pivot coupling for translating rotational motion from the pin to the first end of the connecting shaft. The tilt steering mechanism includes an index member for indexing the steering shaft in any one of a plurality of tilt positions, a tilt lever for use in adjusting the steering shaft in to any one of the plurality of tilt positions, a carrier for use in pivoting the tilt lever, and connecting means for operatively connecting the carrier to the frame. The index member moves with the steering shaft as the steering shaft is tilted.

According to another aspect of the invention, a tilt steering mechanism is used with an associated vehicle that has a frame, a first wheel operatively connected to the frame, and a tiltable steering shaft for selectively steering the first wheel. The tilt steering mechanism includes an index member for indexing the steering shaft in any one of a plurality of tilt positions, a tilt lever for use in adjusting the steering shaft into any one of the plurality of tilt positions, a carrier for use in pivoting the tilt lever, and connecting means for operatively connecting the carrier to the frame of the vehicle. The index member moves with the steering shaft as the steering shaft is tilted.

According to yet another aspect of the invention, a method is provided for adjusting the tilt position of a tiltable steering shaft. The method includes the steps of pivoting a tilt lever that is operatively connected to the steering shaft about a boss region on a carrier, lifting an extension of the tilt lever out of a first index slot of an index member, lifting the extension of the tilt lever out of a first carrier extension slot of the carrier, adjusting the tilt position of the tiltable steering shaft, releasing the tilt lever, pivoting the tilt lever about the boss region on the carrier, placing the extension of the tilt lever into a second index slot of the index member, and placing the extension of the tilt lever back into the first carrier extension slot of the carrier.

According to another aspect of the present invention, a pivoting shaft mechanism is provided for use with an associated vehicle that has a frame, a steering implement, a first wheel operatively connected to the frame, and linkage means operatively connected to the first wheel for use in turning the first wheel. The pivoting shaft mechanism includes a steering shaft having first and second ends for selectively steering the first wheel. The first end of the steering shaft is operatively connected to the steering implement and the steering shaft is pivotable about its second end. The pivoting shaft mechanism also includes a pin having a pin length operatively connected to the second end of the steering shaft, a connecting shaft having first and second ends wherein the second end is operatively connected to the linkage means, and a pivot coupling for translating rotational motion from the pin to the first end of the connecting shaft. The pivot coupling has a pin cavity with a pin cavity length for receiving the pin. The pin cavity length is greater than the pin length. In this way the pin fits fully within the pin cavity.

One advantage of the present invention is that it is easy for the operator to tilt adjust the steering shaft and thus the steering implement on the lawn tractor.

Another advantage of the present invention is that the steering shaft remains in place even when a relatively large force is applied to the steering wheel.

Another advantage of the present invention is that the steering shaft remains snuggly in its tilt position even after extensive use. This greatly reduces the loose feeling that an operator might sense in known tilt mechanisms.

Another advantage of the present invention is that it eliminates the need for a pivot pin.

Still another advantage of the present invention is that it eliminates the need for a universal joint.

Still other benefits and advantages of the invention will become apparent to those skilled in the art to which it pertains upon a reading and understanding of the following detailed specification.

BRIEF DESCRIPTION OF THE DRAWINGS

The invention may take physical form in certain parts and arrangement of parts, a preferred embodiment of which will be described in detail in this specification and illustrated in the accompanying drawings which form a part hereof and wherein.

DESCRIPTION OF THE PREFERRED EMBODIMENT

Figure 1:
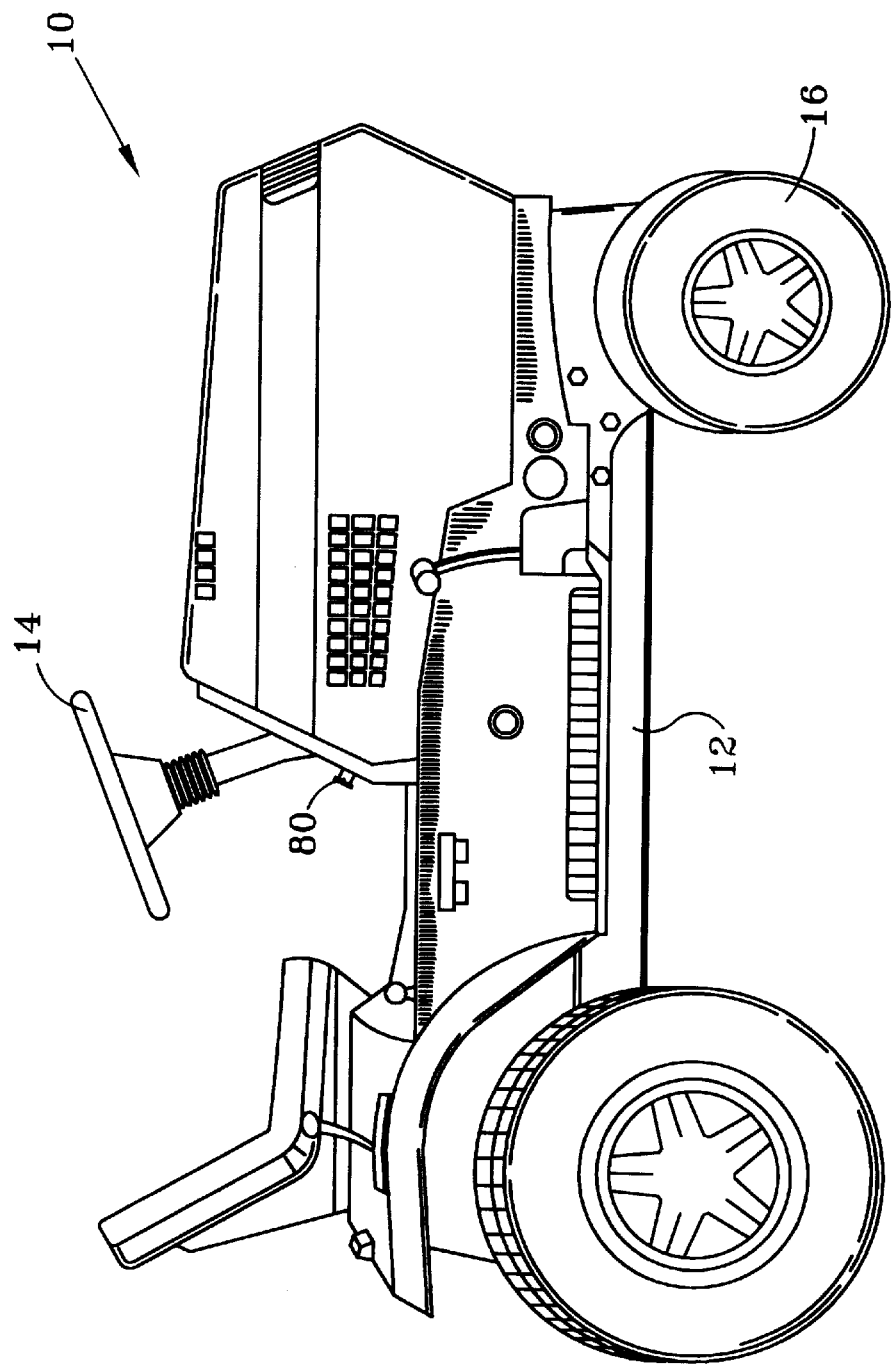
FIG. 1 is an elevation side view of a lawn tractor equipped with the pivoting shaft mechanism and the tilt steering mechanism of the present invention.

Referring now to the drawings, which are for purposes of illustrating a preferred embodiment of the invention only, and not for purposes of limiting the same, FIG. 1 shows a lawn tractor 10 equipped with a pivoting shaft mechanism 30 and a tilt steering mechanism 70 in accordance with this invention. Although this invention is directed to a lawn tractor 10, the invention is applicable to other vehicles, and other applications as well. The lawn tractor 10 has a frame 12 and one or more wheels 16 operatively connected to the frame 12. A steering implement 14 is used to steer the wheels 16. The steering implement 14 can be of any type chosen with sound engineering judgement such as a steering wheel as shown in FIG. 1. The lawn tractor 10 may include a power steering pump 18 (FIG. 5) for use in providing power for the steering of the wheels 16 and linkage means 20 (FIG. 5) operatively connecting the power steering pump 18 to the wheels 16. The use and operation of the power steering pump 18 and the linkage means 20 is considered well known in the art and thus will not be described in any detail in this disclosure. However, it should be noted that a power steering pump is not required for this invention.

With reference now to FIGS. 1–3 and 5, the pivoting shaft mechanism 30 includes a steering shaft 31 having first and second ends 32, 33 that is used in turning at least one of the wheels 16. The second end 33 of the steering shaft 31 has first and second sides 34, 35 and is preferably spherically shaped. The pivoting shaft mechanism 30 also includes a pin 40 that is operatively connected to the second end 33 of the steering shaft 31. Preferably the pin 40 is positioned within the spherical second end 33 such that a first end 41 of the pin 40 extends out the first side 34 of the second end 33 and a second end 42 of the pin 40 extends out the second side 35. It should be noted that the pin 40 has a pin length PL that will be discussed further below.

Figure 2:
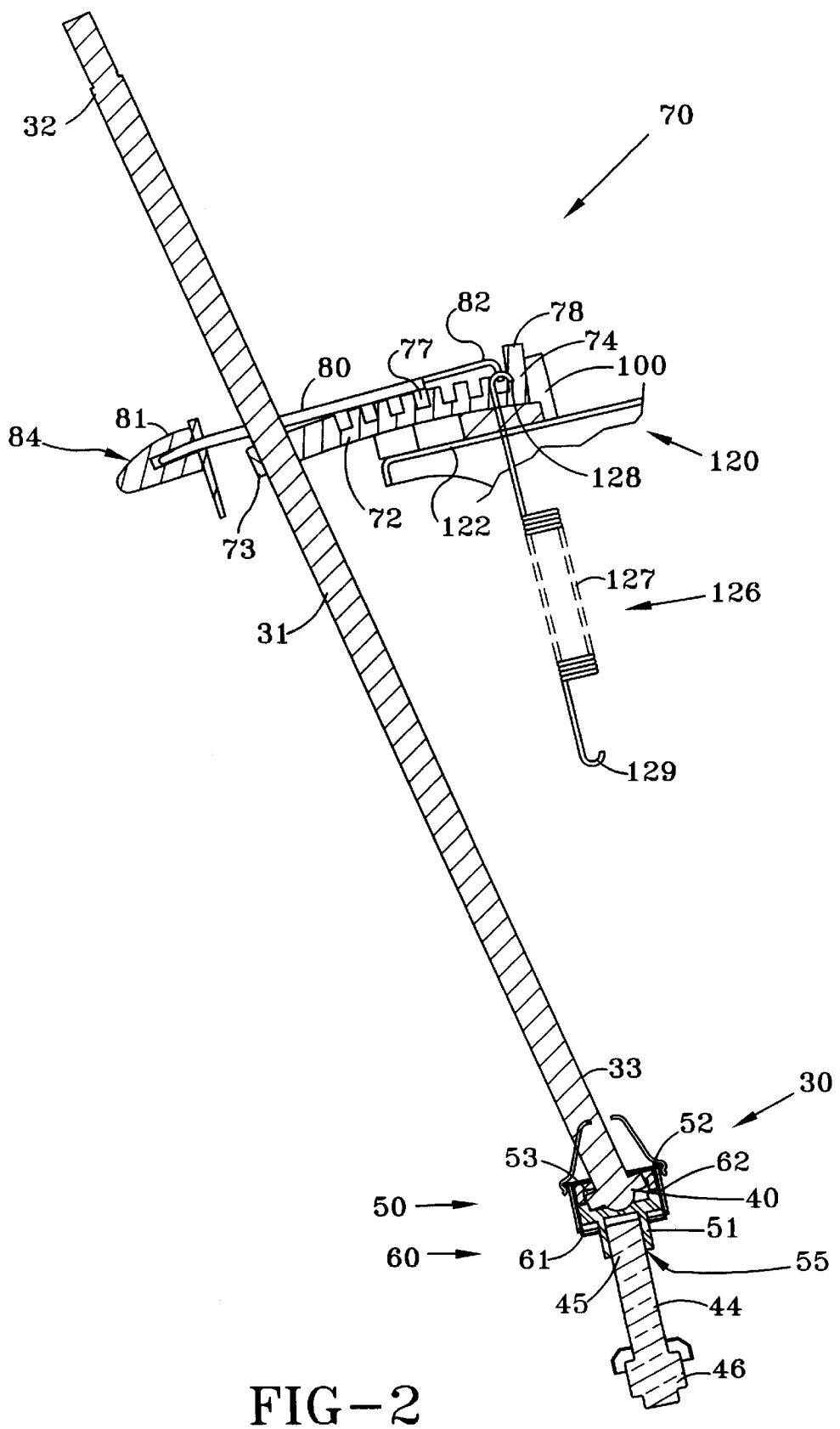
FIG. 2 is an elevation side cross-sectional view of the pivoting shaft mechanism and tilt steering mechanism showing the second end of the steering shaft and the pin within the pin cavity of the pivot coupling as well as showing the extension of the tilt lever positioned within an index slot of the index member.
Figure 3:
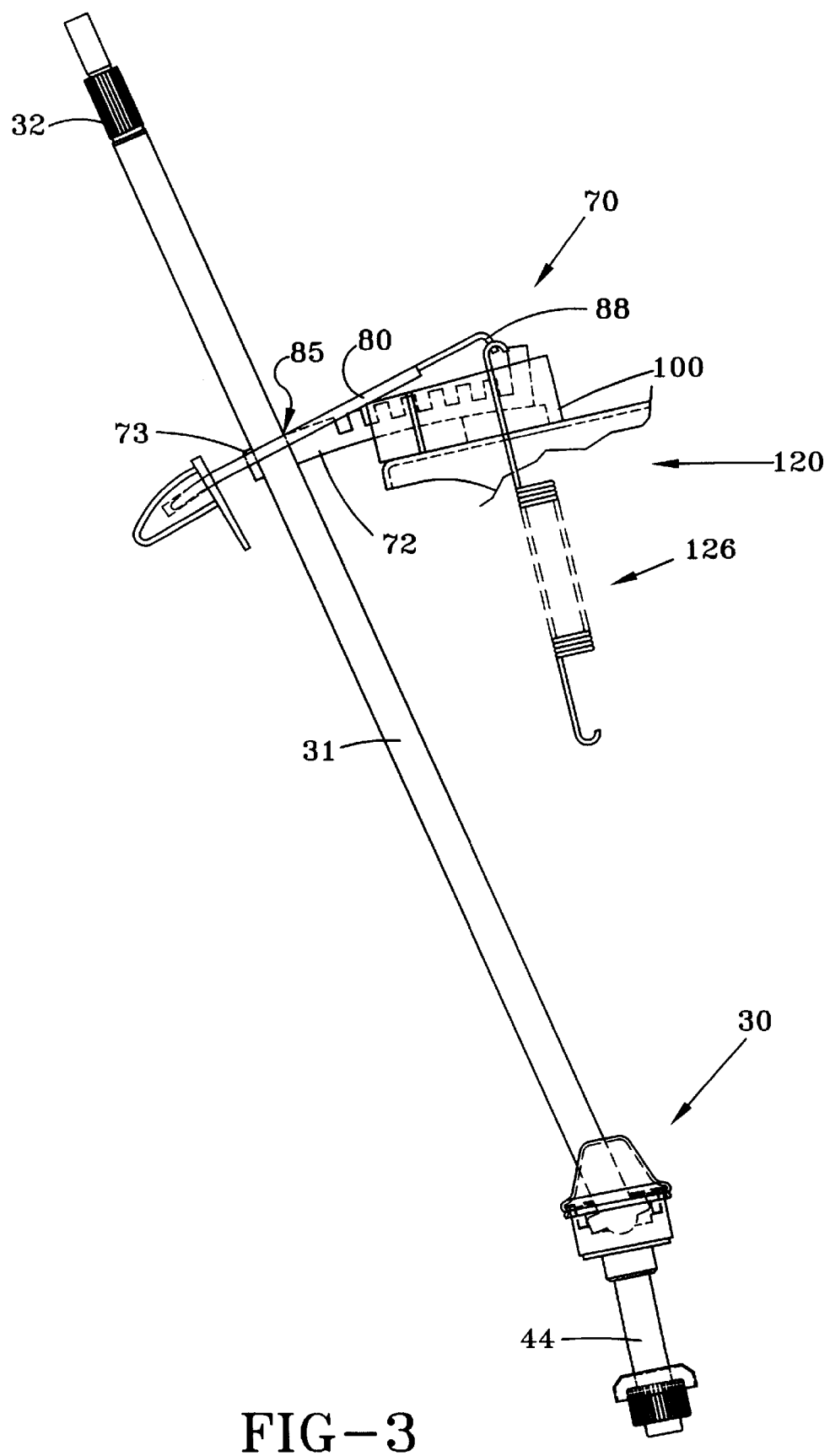
FIG. 3 is an elevation side view similar to that of FIG. 2 but not in cross-section and showing the tilt lever in an adjustment position with the extension removed from all the index slots of the index member.
Figure 5:
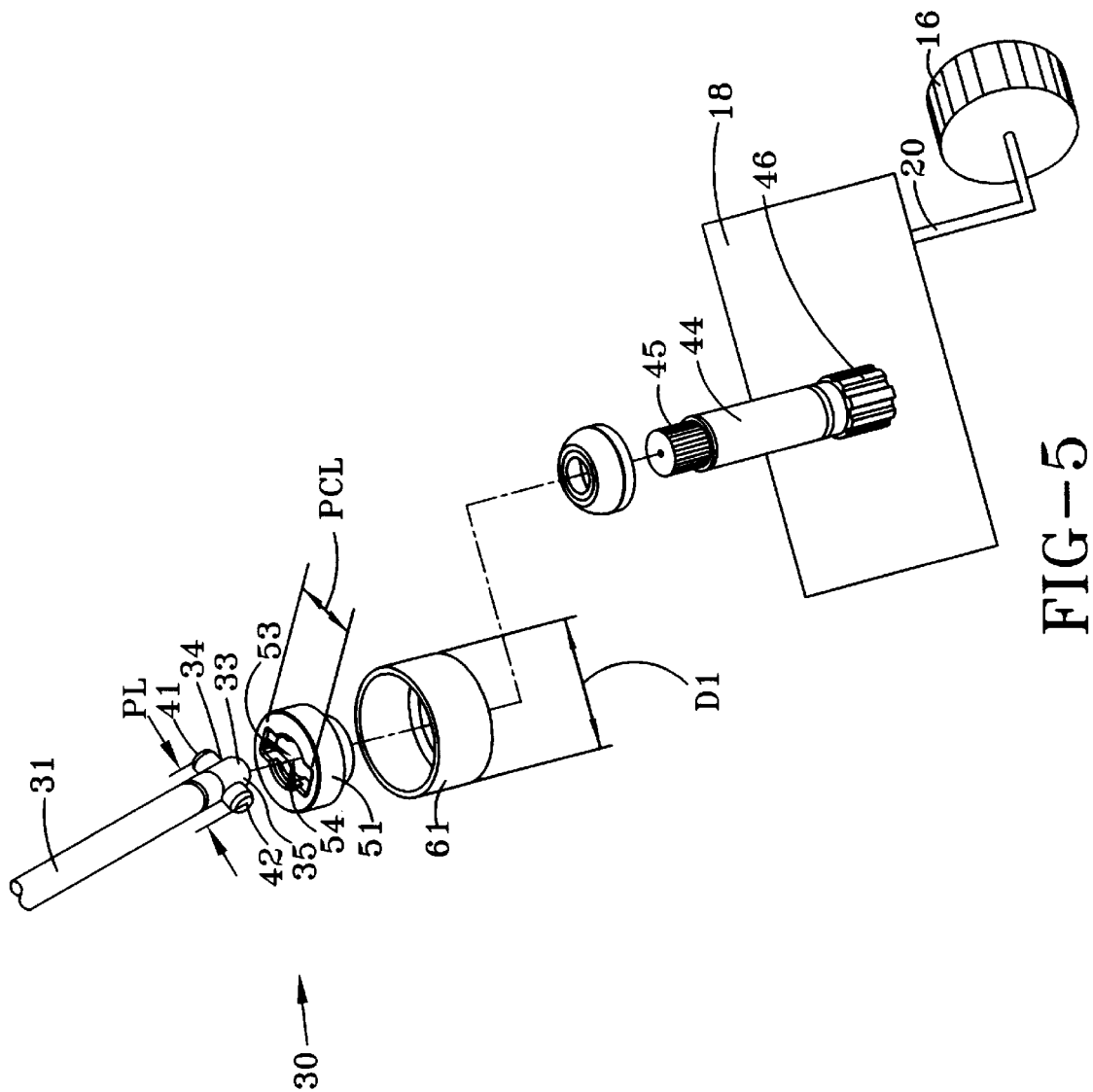
FIG. 5 is a perspective assembly view showing how the connecting shaft is operatively connected to a power steering pump and linkage means (both shown in representative form) with the bottom portion of the steering shaft.
Figure 6:
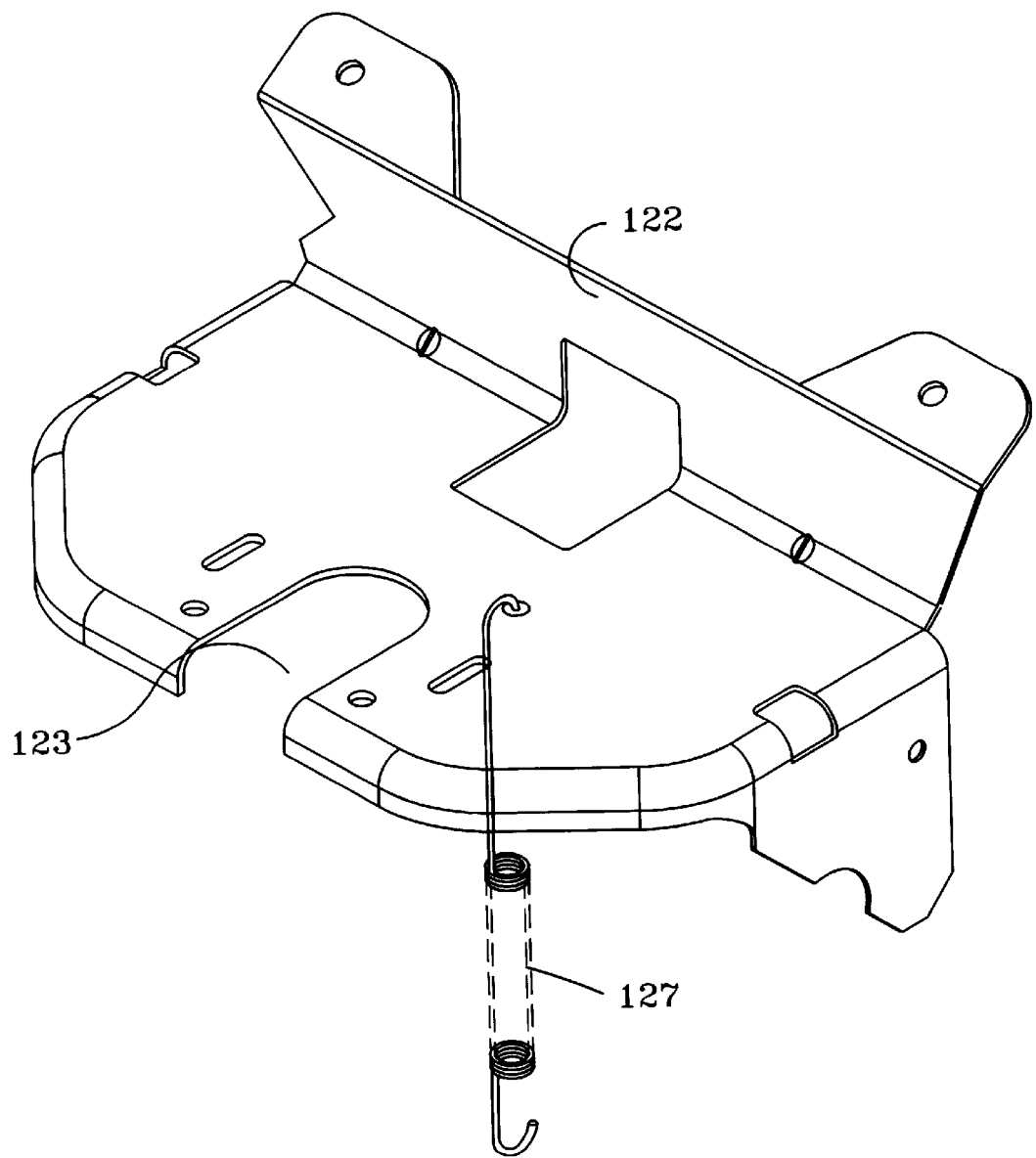
FIG. 6 is a perspective assembly view of the mounting bracket that is used to connect the carrier to the frame of the lawn tractor.

With reference now to FIGS. 2–3 and 5, the pivoting shaft mechanism 30 also includes a connecting shaft 44 that has a first end 45 operatively connected to the second end 33 of the steering shaft 31 and a second end 46 operatively connected to the power steering pump 18. The operation of the second end 46 of the connecting shaft 44 with the power steering pump 18 is considered well known in the art and will not be discussed further in this disclosure.

With reference now to FIGS. 2–5, the pivoting shaft mechanism 30 also includes a pivot coupling 50 that is used to translate rotational motion from the steering shaft 31 through the pin 40 to the first end 45 of the connecting shaft 44. The pivot coupling 50 includes first and second pivot coupling members 51, 52 that together form a pin cavity 53 that receives the pin 40. The pin cavity 53 has a mid-section 54 that is preferably spherically shaped to properly receive the spherically shaped second end 33 of the steering shaft 31. It should be noted that the pin cavity 53 has a pin cavity length PCL that is greater than the pin length PL of the pin 40. Thus, the pin 40 is received within the pin cavity 53 and does not extend beyond it. The first pivot coupling member 51 receives the steering shaft 31 as shown in FIG. 2 and has an aperture 55 for operatively receiving the first end 45 of the connecting shaft 44. The manner in which the first pivot coupling member 51 receives the connecting shaft 44 can be of any type chosen with sound engineering judgement and may include a splined connection as shown in FIG. 5. The second pivot coupling member 52 has an orifice 56 for rotatably receiving the steering shaft 31. It should be noted, as best seen in FIG. 2, that the first pivot coupling member 51 abuts the second pivot coupling member 52.

With continuing reference to FIGS. 2–5, the pivoting shaft mechanism 30 also includes a support coupling 60 for use in supporting the pivot coupling 50. The support coupling 60 includes a first support coupling member 61 that receives the first and second pivot coupling members 51, 52 as well as the steering shaft 31. The first support coupling member 61 is preferably cylindrically shaped and has an outside diameter D1 as shown in FIG. 5. The support coupling 60 also includes a second support coupling member 62 that operatively receives the first support coupling member 61. The second support coupling member 62 is also preferably cylindrically shaped and has an inside diameter D2 (shown in FIG. 4) that is larger than the outside diameter D1 of the first support coupling member 61. In this way the first support coupling member 61 and its contents can fit within the second support coupling member 62. This is shown best in FIG. 2. The second support coupling member 62 has first and second connecting arms 63, 64 for use in connecting the support coupling 60 to the frame 12 of the lawn tractor 10. In this way both the second end 33 of the steering shaft 31 as well as the first end 45 of the connecting shaft 44 are supported to the frame 12.

With reference now to FIGS. 2–4 and 6, the tilt steering mechanism 70 includes an index member 72 that is used to index the steering shaft 31 in any one of a plurality of tilt positions and a tilt lever 80 that is used to adjust the steering shaft 31 into any one of the plurality of tilt positions. The tilt steering mechanism 70 also includes a carrier 100 for use in pivoting the tilt lever 80 and connecting means 120 for operatively connecting the carrier 100 to the frame 12 of the lawn tractor 10. The connecting means 120 can be of any type chosen with sound engineering judgement but in this preferred embodiment includes a mounting bracket 122 that has a mounting bracket shaft slot 123 that rotatably and slidably receives the steering shaft 31 as will be discussed further below.

Figure 4:
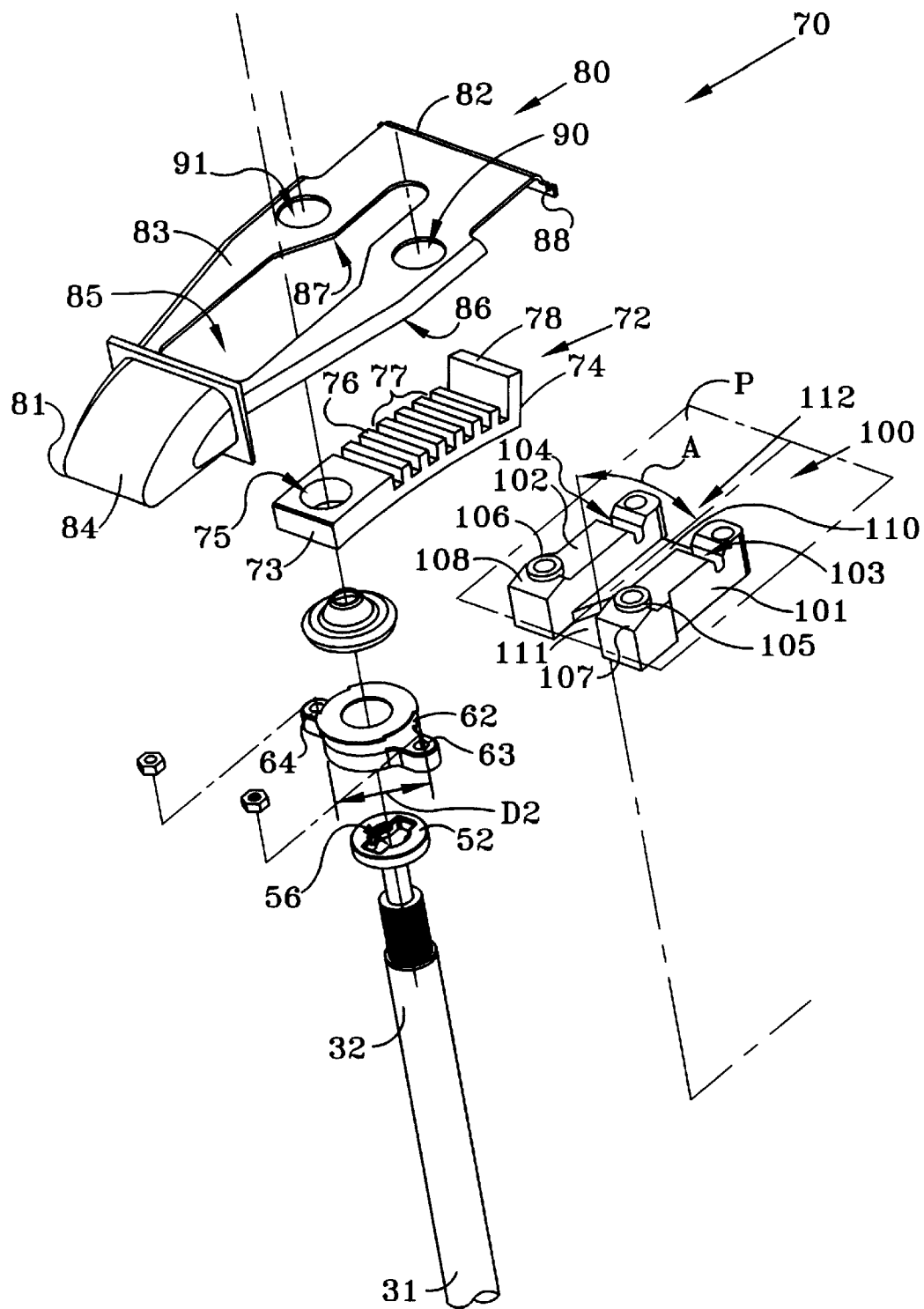
FIG. 4 is a perspective assembly view showing the tilt steering mechanism with the first end of the steering shaft.

With reference now to FIGS. 2–4, the index member 72 has a first end 73 with an opening 75 for rotatably receiving the steering shaft 31. It should be noted that the index member 72 moves with the steering shaft 31 as the steering shaft 31 is tilted. The index member 72 has a mid-section 76 with a plurality of index slots 77. A second end 74 of the index member 72 has a stop wall 78 for use in limiting the tilt position of the steering shaft 31. The index member 72 may be made of any material chosen with sound engineering judgement but is preferably formed of a powder metal material. This allows for a tight tolerance fit and a tight feel for the operator.

With continuing reference to FIGS. 2–4, the tilt lever 80 has first and second ends 81, 82 and a mid-section 83. Fixedly attached to the first end 81 of the tilt lever 80 is a pressable region 84 that is selectively pressed by the operator when it is desired to adjust the tilt position of the steering shaft 31. The mid-section 83 of the tilt lever 80 has a tilt lever shaft slot 85 for rotatably and slidably receiving the steering shaft 31. Both the index member 72 and the steering shaft 31 move with respect to the tilt lever 80 as the steering shaft 31 is tilt adjusted. It should be noted that as the steering shaft 31 is tilt adjusted a portion of the first end 73 of the index member 72 may extend through the tilt lever shaft slot 85 of the tilt lever 80 as best seen in FIG. 3. The mid-section 83 also has first and second pivoting surfaces 86, 87 for use in pivoting the tilt lever 80. Only one pivoting surface is required for this invention. Fixedly attached to the second end 82 of the tilt lever 80 is an extension 88. The extension 88 is operatively received by any of the plurality of index slots 77 of the index member 72. The stop wall 78 of the index member 72 is used to contact the extension 88 and thus limit the movement of the index member 72. This also limits the movement of the steering shaft 31 and thus the amount of tilting for the steering shaft 31. The mid-section 83 of the tilt lever 80 also has first and second holes 90, 91 for use in aligning the tilt lever 80 as will be discussed further below. The tilt lever 80 may be made of any material chosen with sound engineering judgement but is preferably a one piece metal stamping. The pressable region 84 may be a separate piece formed of plastic or rubber that is operatively connected to the first end 81 of the tilt lever 80.

Still referring to FIGS. 2–4, the carrier 100 includes first and second pivoting elements 101, 102. It should be noted that only one pivoting element is required for this invention. The first and second pivoting elements 101, 102 have first and second carrier extension slots 103, 104 respectively for selectively receiving the extension 88 of the tilt lever 80. The first and second pivoting elements 101, 102 also have first and second pegs 105, 106 that are received within the first and second holes 90, 91 of the tilt lever 80 respectively. This properly aligns the tilt lever 80 with respect to the carrier 100. First and second boss regions 107, 108 are provided for selectively contacting the first and second pivoting surfaces 86, 87 of the tilt lever 80 respectively. Thus the first and second pivoting surfaces 86, 87 of the tilt lever 80 pivot or rock on the first and second boss regions 107, 108 of the carrier 100 as shown best in FIG. 3.

With reference now to FIG. 4, the carrier 100 also has a carrier plate 110 that is rigidly connected to the first and second pivoting elements 101, 102. The carrier plate 110 has a shaft slot 111 for rotatably and slidably receiving the steering shaft 31. The carrier plate 110 forms an index slot 112 between the first and second pivoting elements 101, 102. Preferably, the carrier 100 and carrier plate 110 lie substantially within a plane P (FIG. 4). It is further preferred that the plane P is not parallel to the steering shaft 31. As such, it is preferred that the steering shaft and plane P (and hence carrier 100, carrier plate 110, index slot 112 and index member 72) are oriented with respect to one another by an angle A that is greater than zero degrees. The index member 72 slides within the index slot 112 as the steering shaft 31 is tilted. While the index member 72 slides on the carrier plate 110 in the index slot 112, the index member 72 moves substantially parallel to the plane P. The carrier 100 may be made of any material chosen with sound engineering judgement but is preferably formed of a powder metal material as is the index member 72 as noted above. This again allows for a tight tolerance fit and a tight feel for the operator.

With reference now to FIGS. 2–4 and 6, the tilt steering mechanism 70 may also include biasing means 126 for use in biasing the tilt lever 80 into a closed or locked position. By closed or locked position it is meant that the extension 88 of the tilt lever 80 is positioned fully within the appropriate index slot 77 of the index member 72. Thus the biasing means 126 secures the tilt lever 80 into any one of the plurality of tilt positions. The biasing means 126 can be of any type chosen with sound engineering judgement but in the preferred embodiment includes a spring 127 having a first end 128 operatively connected to the second end 82 of the tilt lever 80 and a second end 129 that is operatively connected to the frame 12 of the lawn tractor 10. Preferably, the first end 128 of the spring 127 is connected to the extension 88 of the tilt lever 80. The second end 129 of the spring 127 may be operatively connected to the mounting bracket 122.

With reference now to FIGS. 1–6, the steering shaft 31 can have its tilt position adjusted in a manner that will now be described. The operator first presses the pressable region 84 of the tilt lever 80 thereby pivoting the tilt lever 80 about the first and second boss regions 107, 108 of the first and second pivoting elements 101, 102 of the carrier 100. This lifts the extension 88 of the tilt lever 80 out of all of the index slots 77 of the index member 72. This is the condition shown in FIG. 3. As the extension 88 is lifted out of the index slot 77 it is also lifted out of the first and second carrier extension slots 103, 104. At this point the tilt position of the steering shaft 31 can be adjusted. This may be done, for example, by pushing or pulling the steering implement 14. As the steering shaft 31 is tilt adjusted, the index member 72 moves with respect to the tilt lever 80. At the same time, the index member 72 slides within the index slot 112 of the carrier 100. Tilt adjusting the steering shaft 31 also causes the steering shaft 31 to be slidably moved within the tilt lever shaft slot 85 of the tilt lever 80, the shaft slot 111 of the carrier 100 and the mounting bracket shaft slot 123 of the mounting bracket 122.

With continuing reference to FIGS. 1–6, it should be noted that as the steering shaft 31 is tilt adjusted, it pivots about its second end 33. Therefore, the pin cavity 53 of the pivot coupling 50 must be large enough for the second end 33 of the steering shaft 31 as well as the pin 40 to properly pivot within the pin cavity 53. Thus the pin 40 cannot have a tight fit inside the pin cavity 53. This is seen best in FIG. 2. Once the steering shaft 31 has been tilt adjusted, the operator releases the tilt lever 80. This causes the tilt lever 80 to again pivot about the first and second boss regions 107, 108 on the carrier 100. The extension 88 of the tilt lever is then placed into the appropriate index slot 77 on the index member 72. At the same time, the extension 88 is placed back into the first and second carrier extension slots 103, 104 of the first and second pivoting elements 101, 102. This is the condition shown in FIG. 2.

The preferred embodiments have been described, hereinabove. It will be apparent to those skilled in the art that the above methods may incorporate changes and modifications without departing from the general scope of this invention.

It is intended to include all such modifications and alterations in so far as they come within the scope of the appended claims or the equivalents thereof.

Having thus described the invention, it is now claimed:
What is claimed is:

1. A lawn tractor comprising:
   a frame;
   a first wheel operatively connected to said frame;
   a steering implement for use in steering said first wheel;
   a power steering pump for use in providing power for the steering of said first wheel, said power steering pump being operatively connected to said first wheel;
   a pivoting shaft mechanism that includes,
      A) a steering shaft having first and second ends for selectively turning said first wheel, said first end of said steering shaft being operatively connected to said steering implement, said steering shaft being selectively pivotable about said second end of said steering shaft;
      B) a pin operatively connected to said second end of said steering shaft;
      C) a connecting shaft having a first end operatively connected to said second end of said steering shaft and a second end operatively connected to said power steering pump; and,
      D) a pivot coupling for translating rotational motion from said pin to said first end of said connecting shaft; and,
   a tilt steering mechanism that includes,
      A) an index member for indexing said steering shaft -in any one of a plurality of tilt positions, said steering shaft moving said index member as said steering shaft is tilted;
      B) a tilt lever for use in adjusting said steering shaft into any one of said plurality of tilt positions;
      C) a carrier for use in pivoting said tilt lever; and,
      D) connecting means for operatively connecting said carrier to said frame; and,
   wherein said pin has a pin length and said pivot coupling has a pin cavity with a pin cavity length for receiving said pin, said pin cavity length being greater than said pin length; and,
   wherein said index member comprises:
      a first end having an opening for rotatably receiving said steering shaft;
      a mid-section having a plurality of index slots; and,
      a second end having a stop wall for use in limiting the tilt position of said steering shaft.

2. The lawn tractor of claim 1 wherein said tilt lever comprises:
   a first end having a pressable region;
   a mid-section having a tilt lever shaft slot for rotatably and slidably receiving the steering shaft, the steering shaft and said index member moving with respect to said tilt lever as the steering shaft is tilted, said mid-section also having first and second pivoting surfaces for use in pivoting said tilt lever; and,
   a second end having an extension, any of said plurality of index slots of said index member selectively receiving said extension, said stop wall of said index member for use in selectively contacting said extension of said tilt lever.

3. The lawn tractor of claim 2 wherein said mid-section of said tilt lever has first and second holes for use in aligning said tilt lever, said carrier comprising:

A) a first pivoting element having a first carrier extension slot for selectively receiving said extension of said tilt lever, said first pivoting element also including,
      (1) a first peg, said first hole of said tilt lever operatively receiving said first peg; and,
      (2) a first boss region, said first boss region selectively contacting said first pivoting surface of said tilt lever; and,
   B) a second pivoting element having a second carrier extension slot for selectively receiving said extension of said tilt lever, said second pivoting element also including,
      (1) a second peg, said second hole of said tilt lever operatively receiving said second peg; and,
      (2) a second boss region, said second boss region selectively contacting said second pivoting surface of said tilt lever; and,
   C) a carrier plate rigidly connected to said first and second pivoting elements, said carrier plate having a shaft slot for rotatably and slidably receiving said steering shaft, said carrier plate forming an index slot between said first and second pivoting elements, said index member selectively slidable within said index slot.

4. The lawn tractor of claim 3 wherein said second end of said steering shaft is spherically shaped and has first and second sides, said pin having first and second ends that extend out of said first and second sides of said second end of said steering shaft respectively, said pivot coupling comprising:
   first and second pivot coupling members that together form said pin cavity, said pin cavity having a spherically shaped mid-section for pivotably receiving said second end of said steering shaft, said first pivot coupling member having an aperture for operatively receiving said first end of said connecting shaft, said second pivot coupling member having an orifice for rotatably receiving said steering shaft, said first pivot coupling member abutting said second pivot coupling member.

5. The lawn tractor of claim 4 wherein said pivoting shaft mechanism further comprises:
   a support coupling for supporting said pivot coupling, said support coupling including,
      A) a first support coupling member for receiving said first and second pivot coupling members, said first support coupling member being cylindrically shaped with an outside diameter; and,
      B) a second support coupling member for receiving said first support coupling member, said second support coupling member being cylindrically shaped with an inside diameter that is larger than said outside diameter of said first support coupling member, said second support coupling member having first and second connecting arms for use in connecting said support coupling to the frame of said lawn tractor.

6. A tilt steering mechanism for use with an associated vehicle having a frame, a first wheel operatively connected to the frame, and a tiltable steering shaft for selectively steering the first wheel, said tilt steering mechanism comprising:
   an index member for indexing the steering shaft in any one of a plurality of tilt positions, the steering shaft moving said index member as the steering shaft is tilted;
   a tilt lever for use in adjusting the steering shaft into any one of said plurality of tilt positions;

a carrier for use in pivoting said tilt lever, said carrier lying substantially within a plane (P), said plane (P) not being substantially parallel to the steering shaft, said carrier comprising:

an index slot, said index slot being substantially parallel to said plane (P), said index member sliding within and substantially parallel to said index slot when said steering shaft moves said index member; and, connecting means for operatively connecting said carrier to the frame of the associated vehicle.

7. The tilt steering mechanism of claim 6 wherein said index member comprises:

a first end having an opening for rotatably receiving the steering shaft;

a mid-section having a plurality of index slots; and, a second end having a stop wall for use in limiting the tilt position of the steering shaft.

8. The tilt steering mechanism of claim 6 wherein said carrier has a first carrier shaft slot for rotatably and slidably receiving the steering shaft.

9. A tilt steering mechanism for use with an associated vehicle having a frame, a first wheel operatively connected to the frame, and a tiltable steering shaft for selectively steering the first wheel, said tilt steering mechanism comprising:

an index member for indexing the steering shaft in any one of a plurality of tilt positions, the steering shaft moving said index member as the steering shaft is tilted;

a tilt lever for use in adjusting the steering shaft into any one of said plurality of tilt positions, said tilt lever comprising:

a mid-section having a tilt lever shaft slot for rotatably and slidably receiving the steering shaft, the steering shaft and said index member moving with respect to said tilt lever as the steering shaft is tilted;

a carrier for use in pivoting said tilt lever; and, connecting means for operatively connecting said carrier to the frame of the associated vehicle.

10. The tilt steering mechanism of claim 9 wherein said index member has a plurality of index slots and a stopwall and said tilt lever has first and second ends, said tilt lever further comprising:

a first pivoting surface positioned on said mid-section for use in pivoting said tilt lever; and, an extension on said second end, any of said plurality of index slots selectively receiving said extension, said stop wall of said index member for use in selectively contacting said extension of said tilt lever.

11. A tilt steering mechanism for use with an associated vehicle having a frame, a first wheel operatively connected to the frame, and a tiltable steering shaft for selectively steering the first wheel, said tilt steering mechanism comprising:

an index member for indexing the steering shaft in any one of a plurality of tilt positions, the steering shaft moving said index member as the steering shaft is tilted;

a tilt lever for use in adjusting the steering shaft into any one of said plurality of tilt positions;

a carrier for use in pivoting said tilt lever; and, connecting means for operatively connecting said carrier to the frame of the associated vehicle;

wherein said tilt lever has an extension for use in positioning the steering shaft into any one of said plurality of tilt positions, a first hole for use in aligning said tilt lever, and a first pivoting surface for use in pivoting said tilt lever, said carrier comprising:

a first pivoting element having a first carrier extension slot for selectively receiving said extension of said tilt lever;

a first peg, said first hole of said tilt lever selectively receiving said first peg; and, a first boss region for use in selectively contacting said first pivoting surface of said tilt lever.

12. A method of adjusting the tilt position of a tiltable steering shaft, the method comprising the steps of:

pivoting a tilt lever that is operatively connected to the steering shaft about a first boss region on a carrier;

lifting an extension of said tilt lever out of a first index slot of an index member;

lifting said extension of said tilt lever out of a first carrier extension slot of said carrier;

adjusting the tilt position of the tiltable steering shaft;

releasing said tilt lever;

pivoting said tilt lever about said boss region on said carrier;

placing said extension of said tilt lever into a second index slot of said index member;

placing said extension of said tilt lever back into said first carrier extension slot of said carrier.

13. The method of claim 12 wherein, said step of adjusting the tilt position of the titltable steering shaft, comprises the step of:

moving the tiltable steering shaft and said index member with respect to said tilt lever.

14. The method of claim 13 wherein, said step of adjusting the tilt position of the tiltable steering shaft, further comprises the step of:

sliding said index member within a slot formed in said carrier.

15. The method of claim 12 wherein the tiltable steering shaft has first and second ends, said step of adjusting the tilt position of the steering shaft comprising the step of:

pivoting the tiltable steering shaft about the second end of the tiltable steering shaft within a pivot coupling.

16. A pivoting shaft mechanism for use with an associated vehicle having a frame, a steering implement, a first wheel operatively connected to the frame, and linkage means operatively connected to said first wheel for use in turning the first wheel, said pivoting shaft mechanism comprising:

a steering shaft having first and second ends for selectively steering the first wheel, said first end of said steering shaft being operatively connected to said steering implement, said steering shaft being selectively pivotable about said second end of said steering shaft;

a pin having a pin length operatively connected to said second end of said steering shaft;

a connecting shaft having first and second ends, said second end being operatively connected to the linkage means;

a pivot coupling for translating rotational motion from said pin to said first end of said connecting shaft, said pivot coupling having a pin cavity with a pin cavity length for receiving said pin, said pin cavity length being greater than said pin length;

wherein said second end of said steering shaft is spherically shaped and has first and second sides, said pin having first and second ends that extend out of said first and second sides of said second end of said steering shaft respectively, said pivot coupling comprising:

first and second pivot coupling members together forming said pin cavity, said pin cavity having a spherically shaped mid-section for pivotably receiving said second end of said steering shaft;

wherein said first pivot coupling member has an aperture for operatively receiving said first end of said connecting shaft, said second pivot coupling member having an orifice for rotatably receiving said steering shaft, said first pivot coupling member abutting said second pivot coupling member; and, a support coupling for supporting said pivot coupling, said support coupling including,
   A) a first support coupling member for receiving said first and second pivot coupling members, said first support coupling member being cylindrically shaped with an outside diameter; and,
   B) a second support coupling member for receiving said first support coupling member, said second support coupling member being cylindrically shaped with an inside diameter that is larger than said outside diameter of said first support coupling member.

17. The pivoting shaft mechanism of claim 16 wherein said second support coupling member further comprises:

a first connecting arm for use in connecting said support coupling to the frame of the associated vehicle.

18. A tilt steering mechanism for use with an associated vehicle having a frame, a first wheel operatively connected to the frame, and a tiltable steering shaft for selectively steering the first wheel, said tilt steering mechanism comprising:

an index member for indexing the steering shaft in any one of a plurality of tilt positions, the steering shaft moving said index member as the steering shaft is tilted;

a tilt lever for use in adjusting the steering shaft into any one of said plurality of tilt positions;

a carrier for use in pivoting said tilt lever, said carrier lying substantially within a plane (P), said plane (P) not being substantially parallel to the steering shaft, said carrier comprising:

an index slot defined by a carrier plate, said index slot and said carrier plate being substantially parallel to said plane (P), said index member sliding on said carrier plate and within and substantially parallel to said index slot when said steering shaft moves said index member; and, connecting means for operatively connecting said carrier to the frame of the associated vehicle.

19. A tilt steering mechanism for use with an associated vehicle having at frame, a first wheel operatively connected to the frame, and a tiltable steering shaft for selectively steering the first wheel, said tilt steering mechanism comprising:

an index member for indexing the steering shaft in any one of a plurality of tilt positions, the steering shaft moving said index member as the steering shaft is tilted;

a tilt lever for use in adjusting the steering shaft into any one of said plurality of tilt positions;

a carrier for use in pivoting said tilt lever, said carrier lying substantially within a plane (P), said plane (P) not being substantially parallel to the steering shaft, said index member being slidable within said carrier; and, connecting means for operatively connecting said carrier to the frame of the associated vehicle.

* * * * *